United States Patent
Woollett et al.

(10) Patent No.: US 6,811,209 B2
(45) Date of Patent: Nov. 2, 2004

(54) DOOR FOR AN OPERATOR'S CAB ON AN AGRICULTURAL TRACTOR

(75) Inventors: Nicholas Andrew Woollett, Essex (GB); Alessandro Scotti, Modena (IT)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/348,523

(22) Filed: Jan. 21, 2003

(65) Prior Publication Data

US 2004/0026956 A1 Feb. 12, 2004

(30) Foreign Application Priority Data

Feb. 2, 2002 (GB) .............................................. 0202433

(51) Int. Cl.⁷ ................................................. B60J 5/04
(52) U.S. Cl. .............................. 296/190.11; 296/146.2; 296/146.6; 296/146.11
(58) Field of Search ........................ 296/190.1, 190.11, 296/146.1, 146.2, 146.6, 146.11; 49/397, 399, 501

(56) References Cited

U.S. PATENT DOCUMENTS

| | | | | |
|---|---|---|---|---|
| 5,076,637 A | * | 12/1991 | Larkin et al. ............ | 296/190.1 |
| 5,125,716 A | * | 6/1992 | Smith et al. ............ | 296/190.11 |
| 5,873,612 A | * | 2/1999 | Connor ..................... | 296/190.1 |
| 6,149,228 A | * | 11/2000 | O'Neill et al. ......... | 296/190.01 |
| 6,175,991 B1 | * | 1/2001 | Driesman et al. ....... | 296/146.11 |
| 6,247,746 B1 | * | 6/2001 | Brush ..................... | 296/190.11 |
| 6,279,988 B1 | * | 8/2001 | Muraro ................... | 296/190.11 |
| 6,669,272 B2 | * | 12/2003 | Ayabe et al. ............ | 296/190.11 |

* cited by examiner

Primary Examiner—Jason Morrow
(74) Attorney, Agent, or Firm—John William Stader; Collin A. Webb

(57) ABSTRACT

A door for the operator's cab on an agricultural tractor is formed from a frameless single pane of transparent material pivoted at one edge on a pillar of the tractor. The pivot is formed of two hinges affixed to the pane and a reinforcing member extending generally parallel to the pivot axis and interconnecting the wings of the hinges that are affixed to the pane. The reinforcing member is arranged in line with the pillar on which the door is mounted, when viewed from the position of the driver of the vehicle, so as to minimize obstruction of the field of view of the driver. In another aspect of the invention, the surfaces on the hinges that mate with the pane are machined to match the contours of the pane while the reinforcing member and the hinges are in one piece.

14 Claims, 1 Drawing Sheet

DOOR FOR AN OPERATOR'S CAB ON AN AGRICULTURAL TRACTOR

BACKGROUND OF THE INVENTION

The present invention relates to a door for a motor vehicle and in particular an agricultural vehicle, such as a tractor, where it is desirable to maximize visibility.

It is known from U.S. Pat. No. 6,247,746 to provide a door for a tractor which comprises a frameless single pane of transparent material pivoted at one edge on a pillar of the motor vehicle. This door is mounted on the pillar by means of a pair of hinges affixed to the pane. To achieve the necessary rigidity, the hinges are connected to one another by a reinforcing member that extends generally parallel to the pivot axis and interconnects the wings of the hinges that are affixed to the pane.

In the door of the '746 patent, the reinforcing member extending between the hinges obstructs the driver's view and, thus, presents a problem with respect to maximizing the visibility of the operator through the door. Accordingly, an improved door for the operator's cab of an agricultural tractor would be desirable to mitigate this problem.

SUMMARY OF THE INVENTION

It is therefore an object of the present invention to provide a door for the operator's cab of an agricultural tractor that would maximize visibility for the operator.

Thus, in accordance with a first aspect of the invention, there is provided a door for a motor vehicle comprising a frameless single pane of transparent material pivoted at one edge on a pillar of the motor vehicle, wherein the pivot includes a reinforcing member extending generally parallel to the pivot axis, which reinforcing member is arranged in line with the pillar on which the door is mounted when viewed from the position of the driver of the vehicle, so as to minimize obstruction of the field of view of the driver.

The pivot may conveniently comprise two hinges having wings connected to the transparent pane, the reinforcing member extending between the latter two wings.

The invention recognizes in its first aspect that the driver's field of view is unavoidably obstructed by the pillar on which the door is mounted. By aligning the pillar with the hinge reinforcing member, the invention allows the hinges to be reinforced without further obstructing the driver's field of view.

Though the door depicted in U.S. Pat. No. 6,247,746 may be regarded as frameless in that that there is no frame that fits around the entire glass pane, the door nevertheless requires the use of long support arms which are connected to the hinge members and to which the glass pane is affixed near its front and rear edges. These support arms, which are required for rigidity, themselves obstruct the driver's field of view.

According to a second aspect of the invention, there is provided a door for a motor vehicle comprising a frameless single pane of transparent material pivoted at one edge on a pillar of the motor vehicle, wherein the pivot comprises two hinges affixed to the pane and a reinforcing member extending generally parallel to the pivot axis and interconnecting the wings of the hinges that are affixed to the pane, characterized in that the wings of the hinges have surfaces that mate with the transparent pane, which surfaces are machined after the wings have been permanently connected to one another by the reinforcing member.

By forming contoured mating surfaces on the hinge wings that mate accurately with the surface of the transparent pane, the second aspect of the invention allows the pane to be held rigidly by only two fixings that connect directly to the hinge wings. This avoids the need for any further support aims to steady the door when it is open, thereby maintaining the driver's field of view clear.

It is preferred that the hinges and the reinforcing member be cast in one piece but it is alternatively possible for them to be formed from separate components that are suitably permanently connected to one another, such as by welding.

It is important in the second aspect of the invention that the hinges and the reinforcing member should not be able to move relative to one another after the mating surfaces of the hinges have been machined to match the contour of the transparent pane.

In a preferred embodiment of the invention, the pane is contoured such that the pane is in tension when the edges of the pane seal against the door opening, the tension in the pane serving to improve the seal between the pane and the door opening. In other words, in its relaxed state, the pane has a greater curvature than the door opening and the pane is flattened when the door is closed and is held in tension by the door latch mechanism.

Conveniently, the contour of the pane in its relaxed state conforms to that of the door opening in the vicinity of the pivot axis of the hinges and in the vicinity of the door latch mechanism, the deformation of the pane to conform to the door opening being at a maximum along a line transverse to the imaginary shortest line from the latch to the pivot axis. Thus the pane is held against the door opening to form a seal along one direction by the action of the latching mechanism and, transverse to this direction, the tension in the pane resulting from its deformation away from its relaxed position is relied upon to effect a seal against the door opening.

As is conventional, a rubber sealing strip may be provided around the perimeter of the door opening, or more preferably along the periphery of the transparent pane to effect a weatherproof seal.

To assist in closing the door, it is preferred to provide a pull handle, that it is attached at one end to the lower hinge wing and is connected to the transparent pane at its other end.

The pull handle may also conveniently be connected to the latching mechanism. Additionally, the pull handle may be connected to the vehicle frame by a pivoting arm that acts as a stop to limit the extent to which the door can be opened. The latter arm may if desired include a damper to resist the opening of the door in case the pane is caught by a gust of wind when the door is partially open.

For clarity and durability, it is advantageous for the transparent pane to be formed of glass, preferably laminated for safety, but it is alternatively possible to use a plastics material, such as a polycarbonate.

These and other objects, features and advantages are accomplished according to the instant invention by providing a door for the operator's cab on an agricultural tractor which is formed from a frameless single pane of transparent material pivoted at one edge on a pillar of the tractor. The pivot is formed of two hinges affixed to the pane and a reinforcing member extending generally parallel to the pivot axis and interconnecting the wings of the hinges that are affixed to the pane. The reinforcing member is arranged in line with the pillar on which the door is mounted, when viewed from the position of the driver of the vehicle, so as to minimize obstruction of the field of view of the driver. In another aspect of the invention, the surfaces on the hinges that mate with the pane are machined to match the contours of the pane while the reinforcing member and the hinges are in one piece.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
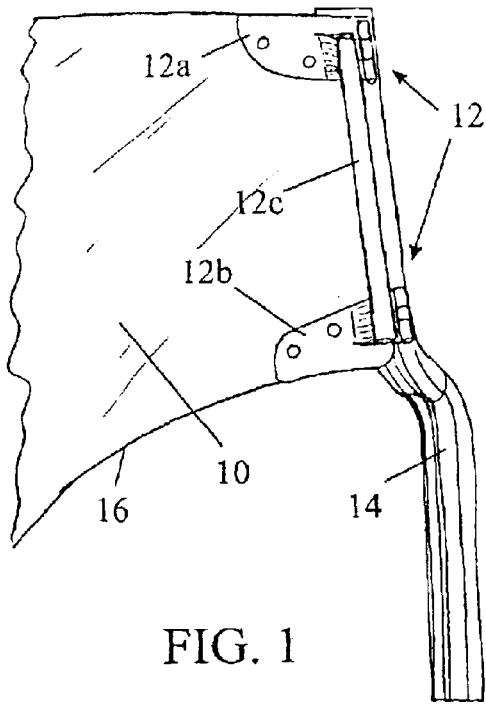
FIG. 1 is a schematic representation of the hinged end of a door mounted on the vehicle pillar of an agricultural tractor.

FIG. 1 shows a glass door 10 mounted by means of a hinge assembly, generally designated 12, on a pillar 14 arranged at the rear of the driver's cabin of a tractor. The curved lower edge 16 of the door fits around the rear wheel arch.

Figure 2:
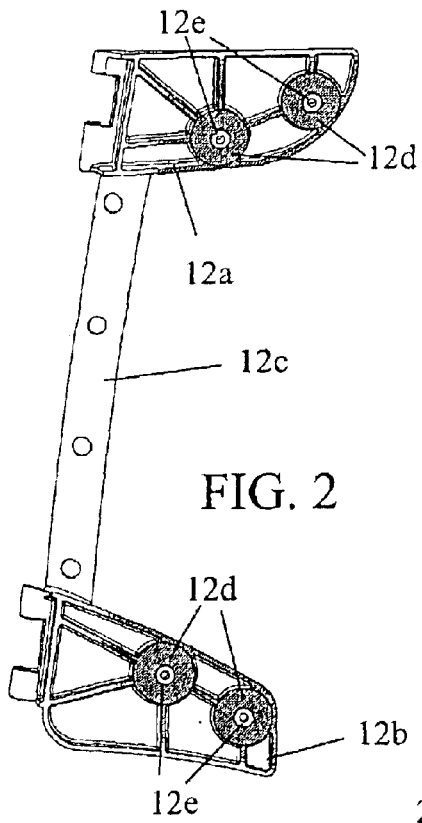
FIG. 2 is a perspective view of the hinge assembly of FIG. 1 as seen from its rear side.

The hinge assembly, which is shown in greater detail in FIG. 2, comprises an upper hinge wing 12a and a lower wing 12b connected to one another by a reinforcing member 12c, in the form of a hollow tube. Preferably, the three components 12a, 12b and 12c are cast in one piece, though they may be formed separately and permanently connected to one another, such as by welding.

Figure 3:
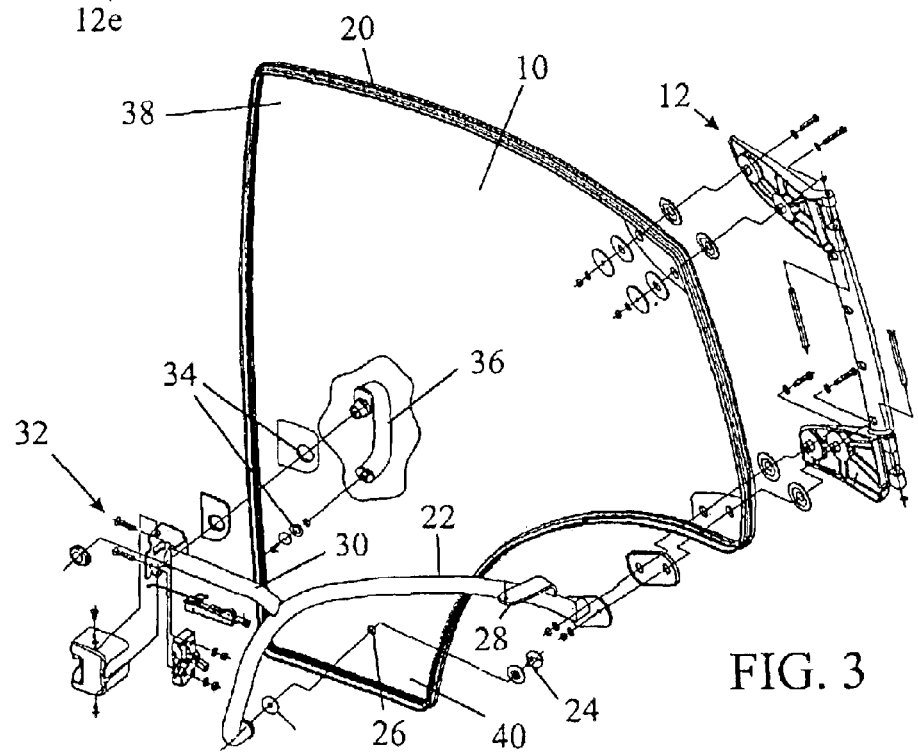
FIG. 3 is an exploded view of a complete door incorporating the hinge assembly of FIGS. 1 and 2.

After casting or welding of the hinge assembly 12, the surfaces of the wings 12a and 12b that mate with the glass door 10, i.e. the shaded surfaces 12d in FIG. 2 are accurately machined to match the contour of the glass door 10. The wings are formed with annular bosses 12e received in holes in the glass door 10 to allow the door 10 to be securely bolted to the hinge assembly (through the use of suitable washers as shown in FIG. 3). Because of the rigidity of the hinge assembly 12 and its secure large surface area mating with the glass pane of the door 10, the door 10 is firmly supported on the pillar 14 and requires no further reinforcements, that would interfere with the driver's field of view. Furthermore, as seen from FIG. 1, the hinge axis is so positioned in relation to the pillar 14 that the reinforcing member 12c lies over the pillar 14. Thus, the reinforcing member 12c is aligned with the pillar 14 when viewed from the driver's position and it does not further obstruct the driver's field of view.

Referring now to FIG. 3, it is seen that the glass pane of the door 10 is surrounded by a weather sealing strip 20. Furthermore, the door 10 is provided with a grab handle 22 which is curved downwards to extend generally parallel to the lower edge 16 of the door, so as once again not to obstruct the driver's field of view. The grab handle is connected to the door at its rear end by means of the bolts that secure the lower hinge wing 12b to the door 10. At its front, the grab handle is anchored to the glass pane of the door 10 by means of a bolt 24 that passes through a hole 26 in the glass pane.

A bracket 28 on the grab handle acts as an anchorage point for a pivoted arm (not shown) that is connected at its other end to the vehicle body. The latter arm acts as a stop to limit the extent to which the door can be opened and it may include a damper to resist rapid opening of the door 10.

The front end of the grab handle 20 is further connected by means of a spur 30 to a latch mechanism 32, which is itself bolted through holes 34 in the door to an external door handle 36. The latching mechanism is conventional and will not therefore be described further other than to explain that it engages a striker pin on the front pillar of the cabin to keep the door closed. The latching mechanism can be disengaged from the striker pin either from within or from outside the cabin, when the door is to be opened.

The glass pane of the door 10 is intentionally manufactured so that it is over-bent, which is to say that it has a greater curvature than the door opening. As the door is being closed, the regions 38 and 40 are the first to make contact with the door opening. At this time, the latch mechanism is still some distance from the striker pin. As the door is closed further, the glass pane flexes and is placed in tension until eventually the latching mechanism engages the striker pin. At this time, a weatherproof seal is formed around the entire periphery of the door in that the latch mechanism is used to keep the door in contact with the door opening along the hinge line and in the vicinity of the latch mechanism whereas the tension in the glass maintains sealing contact in the regions 38 and 40 which are remote from the imaginary line connecting the latch mechanism to the hinge axis.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a door for an operator's cab of an agricultural tractor, being formed from a frameless single pane of transparent material pivoted at one edge on a pillar of the agricultural tractor and having a pivot including a reinforcing member extending generally parallel to the pivot axis, the improvement comprising:
   the reinforcing member being arranged in line with the pillar on which the door is mounted when viewed from the position of the driver of the vehicle, so as to minimize obstruction of the field of view of the driver,
   wherein the pane is contoured such that the pane is in tension when peripheral edges of the pane seal against a door opening in the operator's cab corresponding to the door, the tension in the pane serving to improve the seal between the pane and the door opening.

2. The door of claim 1 wherein the pivot comprises two hinges having wings connected to the transparent pane, the reinforcing member extending between the two wings.

3. The door of claim 2 wherein the wings of the hinges have surfaces that mate with the transparent pane, the surfaces being machined after the wings have been permanently connected to one another by the reinforcing member.

4. The door of claim 3 wherein the wings of the hinges and the reinforcing member are cast in one piece.

5. The door of claim 1 wherein the pane has a contour in a relaxed state that conforms to the shape of the door opening in the vicinity of the pivot axis of the hinges and in the vicinity of a door latching mechanism on the edge of the door remote from the pivot axis, any deformation of the pane to conform to the door opening being at a maximum along a line transverse to an imaginary shortest line from a door latch to the pivot axis.

6. The door of claim 5 wherein a rubber sealing strip is provided around the periphery of the transparent pane to effect a weatherproof seal against the door opening.

7. In a door for an operator's cab of an agricultural tractor, being formed from a frameless single pane of transparent material and being pivoted at one edge on a pillar of the tractor by a pivot formed by two hinges affixed to the pane of transparent material and by a reinforcing member extending generally parallel to a pivot axis of the pivot, the reinforcing member interconnecting the wings of the hinges affixed to the pane, the improvement comprising:

the hinges are formed with wings having surfaces that mate with the transparent pane, the surfaces being machined after the wings have been permanently connected to one another by the reinforcing members, wherein the pane is contoured such that the pane is in tension when peripheral edges of the pane seal against a door opening in the operator's cab corresponding to the door, the tension in the pane serving to improve the seal between the pane and the door opening.

8. The door of claim 7 wherein the wings and the reinforcing member are cast in one piece.

9. The door of claim 7 the reinforcing member is arranged in line with the pillar on which the door is mounted when viewed from the position of the driver of the tractor, so as to minimize obstruction of the field of view of the driver.

10. The door of claim 7 wherein the pane has a contour in a relaxed state that conforms to the shape of the door opening in the vicinity of the pivot axis of the hinges and in the vicinity of a door latching mechanism on the edge of the door remote from the pivot axis, any deformation of the pane to conform to the door opening being at a maximum along a line transverse to an imaginary shortest line from a door latch to the pivot axis.

11. The door of claim 10 wherein a rubber sealing strip is provided around the periphery of the transparent pane to effect a weatherproof seal against the door opening.

12. The door of claim 11 wherein a pull handle is provided which is attached at one end to one of the hinge wings and is connected to the transparent pane at an opposing end.

13. The door of claim 12 wherein the door further comprises a door latching mechanism with the pull handle also being connected to the door latching mechanism.

14. The door of claim 13 wherein the transparent pane is formed of laminated glass.

* * * * *